United States Patent [19]
Tedesco et al.

[11] Patent Number: 5,988,346
[45] Date of Patent: Nov. 23, 1999

[54] METHOD AND APPARATUS FOR ESTABLISHING AND MANAGING VENDING MACHINE SUBSCRIPTIONS

[76] Inventors: Daniel E. Tedesco, 88 Barn Hill Rd., Monroe, Conn. 06468; James A. Jorasch, 25 Forest St., Apt 5G, Stamford, Conn. 06901; Robert R. Lech, 3 Valley View Rd. #25, Norwalk, Conn. 06851

[21] Appl. No.: 08/966,608

[22] Filed: Nov. 10, 1997

[51] Int. Cl.⁶ .............................. G06F 7/08; G06F 17/00
[52] U.S. Cl. ...................... 194/217; 364/479.07; 235/381
[58] Field of Search ...................... 194/217, 218; 364/479.01, 479.02, 479.05, 479.06, 479.07, 479.08, 479.14; 221/9, 2; 235/381, 380, 383

[56] References Cited

U.S. PATENT DOCUMENTS

| | | |
|---|---|---|
| 4,481,590 | 11/1984 | Otten ........................................ 194/217 |
| 4,654,513 | 3/1987 | Hennessy ................................. 235/381 |
| 4,654,800 | 3/1987 | Hayashi et al. . |
| 4,778,983 | 10/1988 | Ushikubo . |
| 5,352,876 | 10/1994 | Watanabe et al. . |
| 5,409,092 | 4/1995 | Itako et al. . |
| 5,440,108 | 8/1995 | Tran et al. .............................. 235/381 |
| 5,621,640 | 4/1997 | Burke . |
| 5,637,845 | 6/1997 | Kolls . |

*Primary Examiner*—Christopher P. Ellis
*Assistant Examiner*—Bryan Jaketic

[57] ABSTRACT

The present invention relates to a method and apparatus for registering a subscription to purchase a plurality of items dispensed by a vending machine. According to a second aspect of the present invention, a method and apparatus are disclosed for dispensing an item by a vending machine in response to a request to redeem at least a portion of a registered subscription. According to a third aspect of the present invention, a method and apparatus are disclosed for dispensing an item by a vending machine based on an estimated availability determined through an analysis of stored subscription data.

36 Claims, 15 Drawing Sheets

```
SUBSCRIBE TO 1 WEEK OF ANY PRODUCT (6 ITEMS)
FOR ONLY $5 - JUST SELECT THE ITEM AND PRESS *1

SUBSCRIBE TO 2 WEEKS OF ANY PRODUCT (14 ITEMS)
FOR ONLY $10 - JUST SELECT THE ITEM AND PRESS *2

SUBSCRIBE TO 3 WEEKS OF ANY PRODUCT (22 ITEMS)
FOR ONLY $15 - JUST SELECT THE ITEM AND PRESS *3
```
124

FIG. 3A

```
YOUR SUBSCRIPTION CODE IS 22516

YOUR SUBSCRIPTION EXPIRES ON 8/8/97
```
124

| SUBSCRIPTION IDENTIFIER 410 | SUBSCRIPTION PRICE 414 | SUBSCRIPTION DURATION 416 | SUBSCRIPTION QUANTITY 418 |
|---|---|---|---|
| *1 | $5.00 | 7 DAYS | 6 |
| *2 | $10.00 | 14 DAYS | 14 |
| *3 | $15.00 | 21 DAYS | 22 |

FIG. 4

| REDEMPTION CODE 510 | PRODUCT IDENTIFIER 512 | SUBSCRIPTION START DATE 514 | SUBSCRIPTION EXPIRATION DATE 516 | QUANTITY REMAINING 518 | SUBSCRIPTION STATUS 520 |
|---|---|---|---|---|---|
| 22516 | COLA | 8/1/97 | 8/8/97 | 0 | EXPIRED |
| 12975 | ORANGE SODA | 8/1/97 | 8/15/97 | 11 | ACTIVE |
| 56297 | ICED TEA | 8/1/97 | 8/22/97 | 15 | ACTIVE |

FIG. 5

| DISPENSER IDENTIFIER 610 | PRODUCT IDENTIFIER 612 | AVAILABLE INVENTORY 614 | PRICE 616 | DEMAND RATE PER DAY 618 | RE-STOCK DATE 620 |
|---|---|---|---|---|---|
| A1 | COLA | 5 | $1.00 | 3.0 | 8/10/97 |
| A2 | ORANGE SODA | 13 | $1.00 | 0.8 | 8/10/97 |
| A3 | GINGER ALE | 20 | $1.00 | 2.6 | 8/10/97 |
| B1 | ICED TEA | 18 | $1.00 | 2.5 | 8/10/97 |
| B2 | COLA | 7 | $1.00 | 3.0 | 8/10/97 |
| B3 | COLA | 9 | $1.00 | 3.0 | 8/10/97 |

METHOD AND APPARATUS FOR ESTABLISHING AND MANAGING VENDING MACHINE SUBSCRIPTIONS

CROSS-REFERENCE TO RELATED APPLICATION

The present invention is related to the following United States Patent Application: "Method and Apparatus for Dynamically Managing Vending Machine Prices," U.S. patent application Ser. No. 08/947,798 filed Oct. 9, 1997, assigned to the assignee of the present invention and incorporated by reference herein.

BACKGROUND OF THE INVENTION

1. Field of the Invention

The present invention relates generally to vending machines. More particularly, the present invention relates to a method and apparatus for establishing and managing subscriptions to purchase items from a vending machine.

2. Description of the Related Art

Vending machines are well known and have existed since the late 1880s. Some of the first vending machines were rudimentary devices primarily designed to dispense cigarettes and postcards. Modern vending machines are employed to store and dispense a vast array of merchandise in response to a customer request and appropriate payment. Such merchandise includes drinks, candy, frozen deserts, snacks, video tapes and children's toys.

Many vending machines are located in factories, office buildings, bowling alleys and other locations that repeat customers regularly frequent. Vending machine operators have found that by locating a vending machine in a high traffic area that is regularly frequented by the same customers, they can not only take advantage of habitual sales, but also take advantage of brand loyalty.

Although machine location, machine loyalty and brand loyalty influence the amount of revenue generated by a vending machine, vending machine operators are confronted with a number of problems which are not adequately addressed by the prior art. One such problem is predicting sales and determining how to stock a particular machine. Although habitual sales and brand loyalty help keep vending machine sales constant, there is no assurance that the regular customers won't purchase their favorite brand from another source. Another problem with prior art vending machines is the inability to complete a sale with a customer who has little or no cash. Yet another problem with the prior art is the inability to reward a customer for regularly frequenting the machine or for purchasing products in bulk over a predetermined time period.

The prior art has attempted to address the problem of predicting sales and determining stock quantities by providing vending machine management software. One such software product is "Windows for Vending PRO with Inventory" produced by VendMaster. This product enables a vending machine operator to report and analyze various historical sales data. VendMaster's product is intended to enhance a vending machine operator's ability to identify high-demand inventory, determine preferable times to stock the machine, and calculate suggested prices.

The VendMaster software, like other attempts to solve the problems of predicting sales and selecting products, utilizes historical sales data to estimate future sales. Using the VendMaster software, a vending machine operator has no assurance that historical trends will continue. A need, therefore, exists for a method or apparatus for more reliably determining future stocking requirements for a vending machine.

U.S. Pat. Nos. 4,008,792 of Levasseur et al. and 4,498,570 of King et al. attempt to solve the problem of providing bulk discounts to vending machine customers. Levasseur et al. discloses a control circuit for a vending machine that enables the vending machine to vend different items costing different amounts and in different quantities at a quantity discount. King et al. discloses a switching device for establishing a first price for a first item sold during a sales transaction and for establishing at least a second price for additional items sold in the same transaction. While these patents generally disclose enabling quantity discounts at a vending machine, they fail to solve the previously described problems facing vending machine operators. A significant shortcoming of these patents is that they both require a customer to take delivery of the bulk purchase at the time of the sale.

The prior art vending machines have attempted to address the problem of a user's shortage of change by providing local change machines, stored value card dispensers and magnetic stripe readers. These attempted solutions enable a vending machine to accept alternative modes of payment for products purchased from a vending machine. Change machines generally allow customers with paper currency to convert their small denomination bills into coinage. Stored value card dispensers and magnetic stripe readers allow users to use stored value cards and conventional credit cards to purchase products from a vending machine.

These approaches fail to completely abate the loss of potential customers. Specifically, prior art solutions have not addressed the loss of a sale to a regular customer who would make a purchase but for an immediate shortage of cash. Solutions employing stored value card dispensers and readers not only require a customer to carry a physical object in order to complete a purchase, but also present significant counterfeit and fraud issues. Magnetic stripe readers configured to accept conventional credit cards have the same problem, but are further limited by the sophisticated equipment and network connections that are required for proper validation. In addition, cards may be easily lost or stolen.

A need therefore exists for a method and apparatus that provides consumers additional payment options for vending machine purchases. A need further exists for a method and apparatus that allows consumers who make frequent purchases at a vending machine to receive items without depositing currency or presenting a physical form of payment every time a customer requests a purchased item. A need also exists for a method and apparatus for more accurately and efficiently managing and predicting inventory of a vending machine.

Accordingly, the shortcomings associated with the related art have heretofore not been adequately addressed. The present invention addresses such problems by providing an apparatus and processing approach that have not previously been proposed.

SUMMARY OF THE INVENTION

The present invention provides a method and apparatus for registering a subscription to purchase a plurality of items dispensed by a vending machine. According to the method of the present invention, the apparatus receives an indication of payment for the subscription and a request to register the subscription. During the registration process, the apparatus determines a redemption code that may be used to redeem items associated with the subscription. The apparatus then stores subscription registration data including the determined redemption code.

According to a second aspect of the present invention, there is disclosed a method and apparatus for dispensing an item by a vending machine. The method includes the steps of receiving, by the apparatus, a request to redeem an item that is associated with a subscription and a redemption code corresponding to the item. The method also includes the step of updating subscription registration data associated with the redemption code to reflect the request to redeem the item. The method concludes with the step of dispensing the requested item.

According to a third aspect of the present invention, a method for processing non-subscription transactions is disclosed. An apparatus for implementing the above described method is also disclosed.

It is an object of the present invention to provide a method and apparatus for establishing and managing subscriptions for purchasing products from a vending machine. Another object of the present invention is to provide a method and apparatus for processing single item sales to customers based on inventory forecasts which compensate for registered subscriptions. The above object and other objects features and advantages are readily apparent from the detailed description when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings, wherein:

FIGS. 3A and 3B illustrate exemplary output displayed on an output device of the vending machine of FIG. 1A;

FIG. 4 is a table illustrating the structure of a subscription option table stored in the memory of the vending machine of FIG. 2;

FIG. 5 is a table illustrating the structure of a subscription registration table stored in the memory of the vending machine of FIG. 2;

FIG. 6 is a table illustrating the structure of an inventory table stored in the memory of the vending machine of FIG. 2;

DETAILED DESCRIPTION

Apparatus Architecture

Figure 1A:
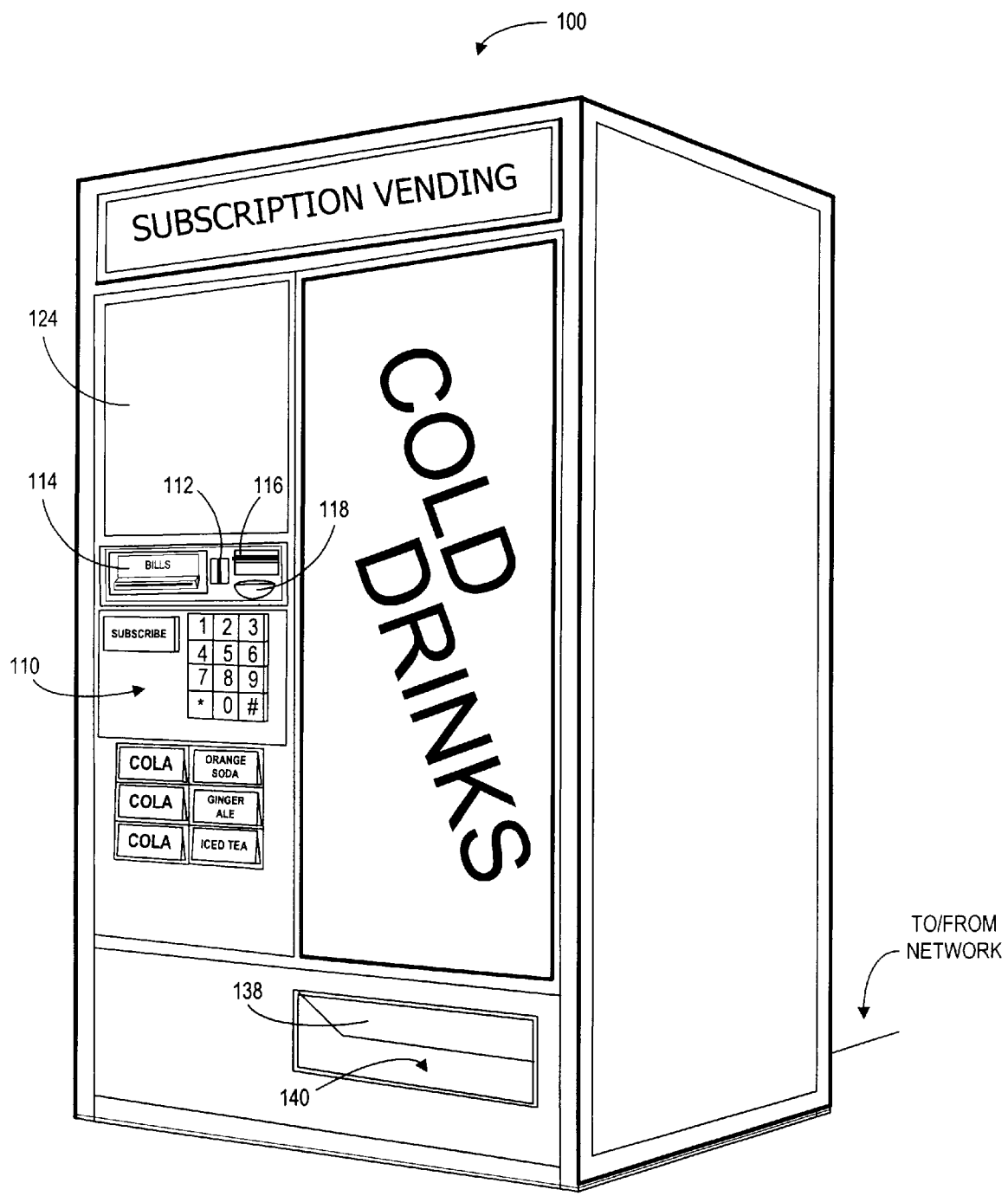
FIG. 1A is a perspective view of a vending machine according to one embodiment of the present invention.
Figure 1B:
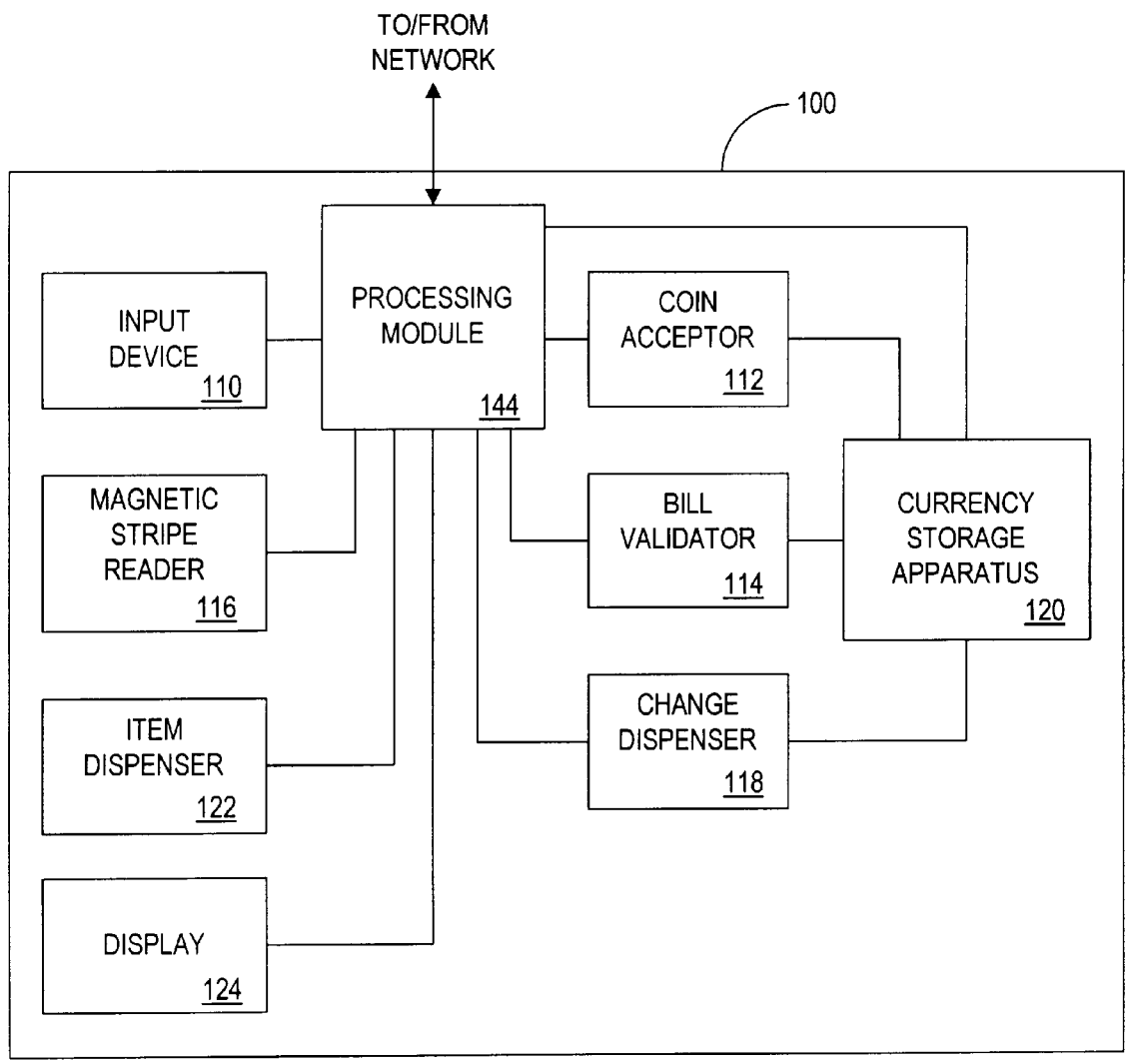
FIG. 1B is a schematic block diagram illustrating the components of the vending machine of FIG. 1A according to one embodiment of the present invention.
Figure 2:
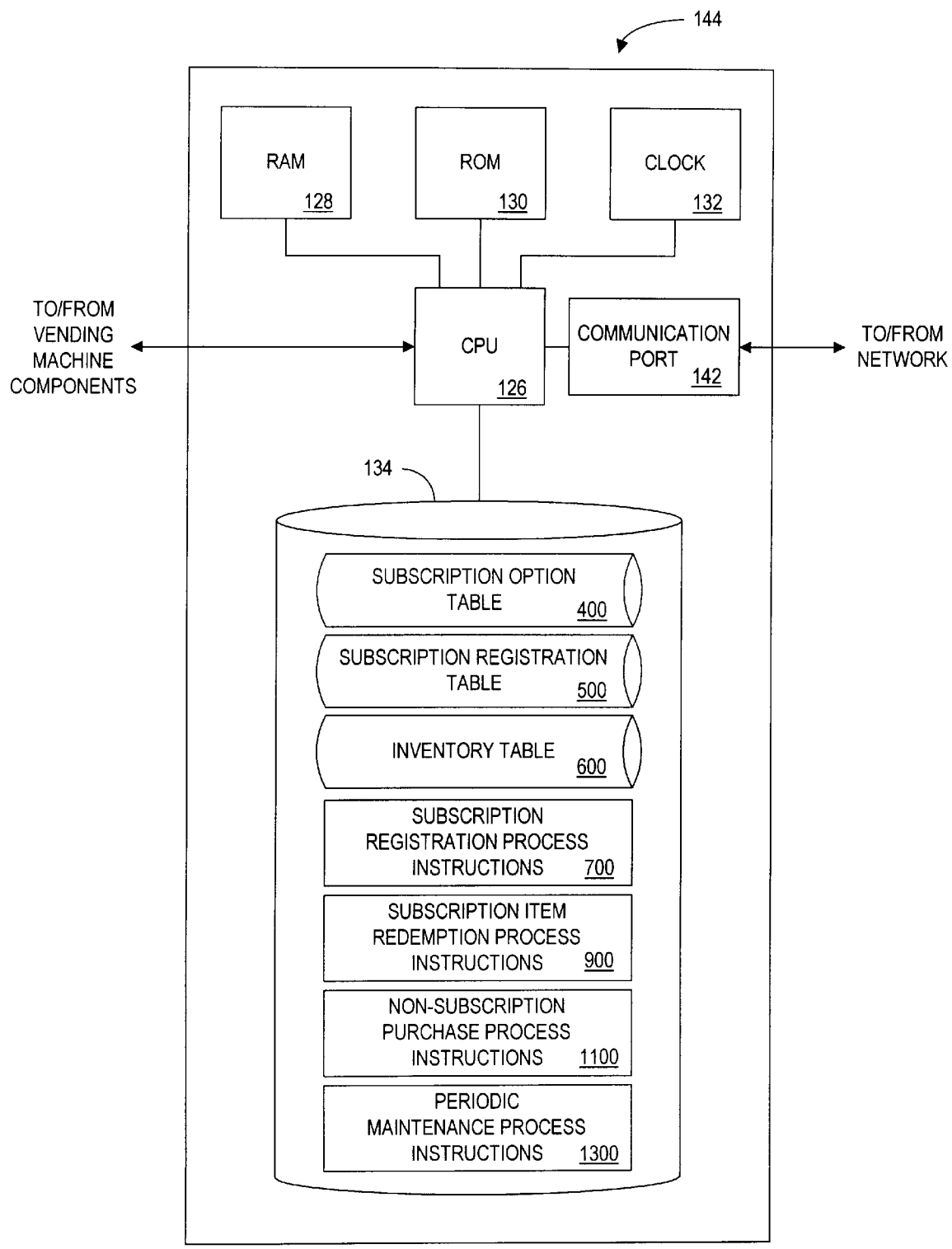
FIG. 2 is a schematic block diagram illustrating the components in connection with the processing module of the vending machine of FIG. 1A.

An embodiment of the method and apparatus of the present invention will now be discussed with reference to FIGS. 1–10. FIGS. 1A–3B illustrate the components of one exemplary vending machine 100 including the features of the present invention. Although specific exemplary vending machine 100 is referred to throughout the detailed description, the present invention is directed to any automatic sales machine that allows payment to be exchanged for goods. Payment can be presented through a variety of media including, but not limited to, coins, bills and other currencies, magnetic stripe cards, smart cards (whether pre-paid or linked to an account) and identification codes. FIG. 1A is a perspective view of vending machine 100; FIG. 1B is a schematic block diagram of vending machine 100; and FIG. 2 is a schematic block diagram of the processing module of vending machine 100.

As shown in FIGS. 1A and 1B, vending machine 100 is a "bubble front" vending machine similar to Vendo model 392140004. Vending machine 100 includes an input device 110 for receiving input from a customer including a product selection, a subscription selection, a redemption code and credit information. Input device 110 may also be used for receiving input from an operator during stocking or maintenance of vending machine 100. Although input device 110, as illustrated, includes a set of alphanumeric keys for providing input to vending machine 100, input device could include a selector dial, a set of buttons associated with a respective set of item dispensers, or any other conventional input device commonly employed by a vending machine designer. Further, vending machine 100 may include more than one input device 110. For example, vending machine 100 may include an exterior input device 110 for receiving customer input and an interior input device (not shown) for receiving operator input. In the illustrated embodiment, input device 110 receives input data from both operators and customers.

Vending machine 100 also includes several mechanisms for receiving payment and dispensing change, including coin acceptor 112, bill validator 114, magnetic stripe reader 116 and change dispenser 118. Magnetic stripe reader 116 is a conventional reader for reading data on the magnetic stripe of a credit or debit card, and it may cooperate with conventional remote point-of-sale credit card processing equipment (not shown) to validate credit based purchases through a conventional credit authorization network. Coin acceptor 112, bill validator 114 and change dispenser 118 communicate with currency storage apparatus 120 and may be conventional devices such as Mars models AE-2400, MC5000, TRC200 or CoinCo model 9300-L. Coin acceptor 112 and bill validator 114 receive and validate currency that is stored by currency storage apparatus 120.

Referring now to FIGS. 1B and 2, coin acceptor 112, bill validator 114, magnetic stripe reader 116 and change dispenser 118 communicate with, and are controlled by, processing module 144. Processing module 144 includes communication port 142 for communicating with a central controller via a network (not shown).

In addition to the elements previously mentioned, processing module 144 includes a central processing unit 126 ("CPU") connected to communication port 142. CPU 126 communicates with random access memory (RAM) 128, read only memory (ROM) 130, clock 132 and storage device 134. CPU 126 also communicates with at least one item dispenser 122 and at least one display 124. Display 124 is preferably a liquid crystal display ("LCD") or a light emitting diode ("LED") display such as the display employed by vending machine model #631 manufactured by FastCorp. Display 124 may provide a static message or a scrolling message so as to provide extensive information using a relatively small display area.

As shown, vending machine 100 includes a single item dispenser 122 and display 124. Other vending machines, having multiple item dispensers and multiple displays may be employed to practice the present invention with minor design modifications. As in many conventional vending machines, item dispenser 122 may be activated by CPU 126 after a customer has purchased an item, causing the item to be transferred to receptacle 140, as illustrated in FIG. 1A. A customer has access to a purchased item in receptacle 140 via door 138. Purchased item can then be removed by a customer from receptacle 140 through door 138.

As shown in FIG. 2, storage device 134 stores a database of inventory and subscription management data, including a subscription option table 400, a subscription registration table 500 and an inventory table 600. Tables 400, 500 and 600 comprise at least a portion of the data stored by storage device 134 and are described more fully with reference to FIGS. 4, 5 and 6, respectively. Storage device 134 further includes instructions for implementing the process steps of the present invention. Specifically, storage device 134 includes subscription registration process instructions 700, subscription redemption process instructions 900, non-subscription purchase process instructions 1100 and periodic maintenance process instructions 1300. Storage device 134 is preferably a magnetic disk drive, but could be a CD-ROM drive, optical disk drive, RAM drive or any other conventional storage device as would be deemed appropriate by one of ordinary skill in the art.

FIG. 3A illustrates an exemplary output of display 124. As shown, the illustrated output sets forth the terms of the various subscriptions available using vending machine 100. FIG. 3B illustrates the output of display 124 after registering a subscription. These and other output messages are described more fully with reference to the process steps described below.

Data Tables

FIG. 4 illustrates the contents of an exemplary subscription option table 400 in tabular format. Each record of subscription option table 400 defines the terms of a valid subscription to purchase merchandise from vending machine 100. Subscription option table 400 includes subscription identifier field 410 containing data that uniquely identifies a subscription record. Subscription option table 400 further includes a subscription price field 414 for storing the price of the subscription, a subscription duration field 416 for storing the amount of time for which the subscription is valid, and a subscription quantity field 418 for storing the number of items that can be purchased with the subscription.

Although the preferred fields of subscription option table 400 are illustrated in FIG. 4, other alternatives are possible. For example, according to one variation, the data stored in subscription price field could represent a unit price instead of the total price of the subscription. This would emphasize the per unit discount for purchasing in bulk. According to another variation, subscription option table 400 may include a product identifier field in order to customize subscription prices according to specific products.

FIG. 5 illustrates the contents of an exemplary subscription registration table 500. Each record of subscription registration table 500 represents a registered subscription purchased by a customer of vending machine 100. Subscription registration table 500 is indexed by the contents of redemption code field 510 that uniquely identifies a registered subscription. Subscription registration table 500 includes product identifier field 512 for storing a product identifier associated with the registered subscription. Subscription start date field 514 and subscription expiration date field 516 store data defining the term of the subscription. Of course, multiple expiration dates could be stored to encourage a more predictable redemption schedule resulting in better inventory management. Quantity remaining field 518 stores the number of items available under the registered subscription, and subscription status field 520 stores data that defines whether the subscription is still valid. Although the preferred embodiment associates a specific product with a registered subscription via product identifier field 512, the present invention may be used to provide subscriptions that are not linked to a specific product. Of course, such an embodiment would not require field 512.

Referring now to FIG. 6, there is illustrated an exemplary inventory table 600. Each record of inventory table 600 represents inventory data associated with an item dispenser 122 of vending machine 100. The contents of dispenser identifier field 610 uniquely identify an item dispenser 122 associated with a record of table 600. Product identifier field 612 stores a product identifier defining the product dispensed by the item dispenser 122 identified by the contents of field 610. Field 614 stores data defining the number of items available for sale from the dispenser. Field 616 defines the non-subscription price of each item associated with the dispenser. Demand rate field 618 stores the rate of demand for items associated with the dispenser, and re-stock date field 620 defines the date on which the dispenser is scheduled to be re-stocked. Alternatively, the re-stock date field 620 could be replaced or supplemented with a field used to define an expiration date for a product.

Process Steps

Having thus described the system architecture and components of the present embodiment, the operation of the system will now be described in greater detail with reference to FIGS. 7–13 and continuing reference to FIGS. 1–6. It is to be understood that the software instructions necessary to provide the functionality described herein are preferably stored in storage device 134 of vending machine 100, but may be stored in ROM 130.

Figure 7:
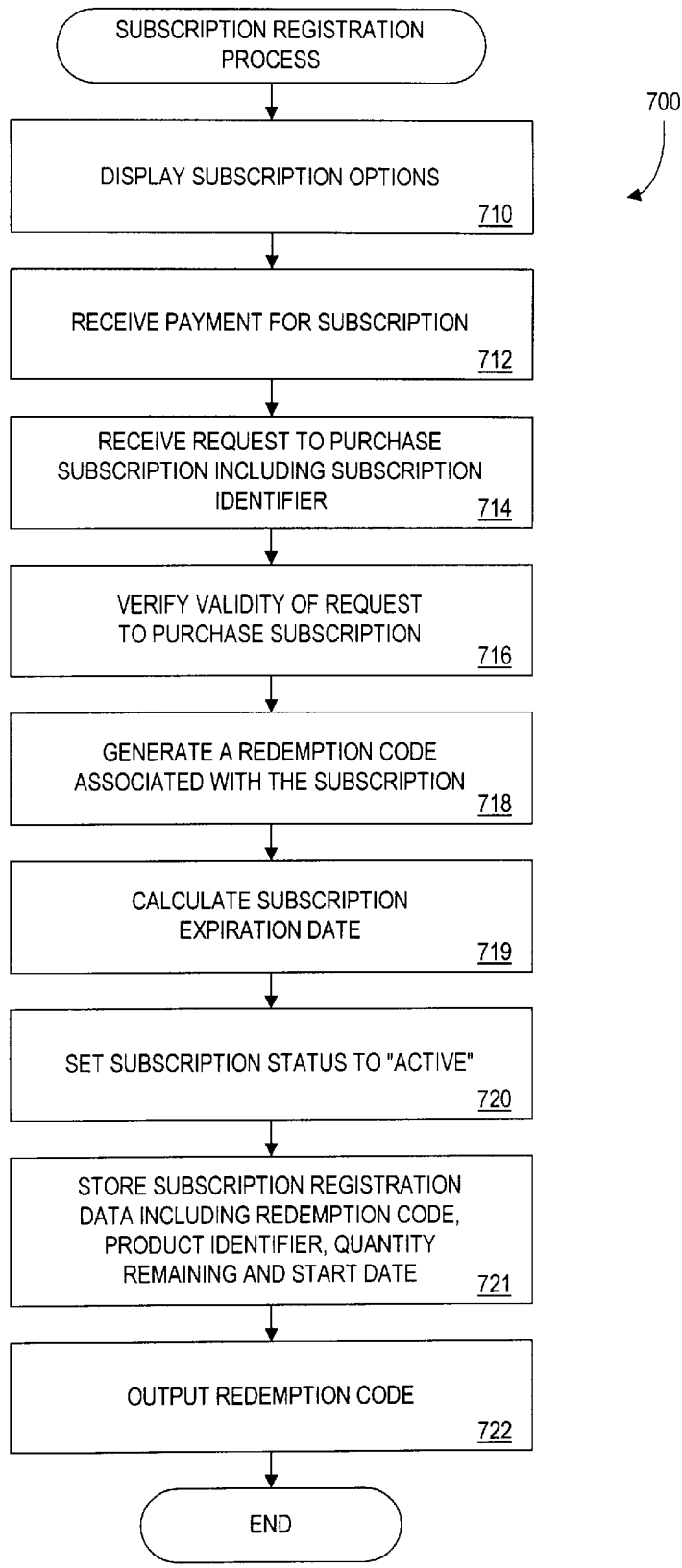
FIG. 7 is a flow chart illustrating the computer implemented steps used to register a subscription to purchase items from the vending machine of FIG. 1.

Referring now to FIG. 7, a flowchart is depicted illustrating the steps of subscription registration process instructions 700. The exemplary subscription registration process includes the step of displaying subscription options available for purchase. The step of displaying, identified by reference numeral 710, may be accomplished using a flyer, a preprinted sign or other collateral material associated with vending machine 100 or it may be accomplished electronically via display 124.

At step 712, vending machine 100 receives payment via coin acceptor 112, bill validator 114 or magnetic stripe reader 116. Alternatively, payment could be accomplished via input device 110 by receiving user input of a predefined debit or credit account number. Regardless of the form of payment, an indication of payment receipt is transmitted to CPU 126.

The subscription registration process further includes the step of receiving a request to purchase a subscription, as indicated by step 714. The request to purchase the subscription includes an identification of the subscription option to be purchased. In the present embodiment, identification of the subscription is accomplished simply by receiving a subscription identifier, such as "*2," that identifies the terms of the subscription via input device 110. The user then presses a button identifying the product to be associated with the subscription. In alternate embodiments, the user may be required to input the specific terms of the desired subscription, including a product identifier, a payment amount, and a quantity.

At step 716, CPU 126 verifies the request to purchase the subscription. The step of verifying the request to purchase the subscription may include a number of sub-steps, including validating that the received subscription identifier matches a subscription identifier stored in field 410 of subscription option table 400, that the received payment is sufficient to purchase the identified subscription, and that vending machine 100 can support the identified subscription based on present demand for the subscribed product. These sub-steps are described more fully with reference to FIGS. 8A and 8B.

After verifying the validity of the subscription request, CPU 126 generates a redemption code associated with the subscription, as shown by step 718. The generated redemption code could be a personal identification number ("PIN") received from the customer, a number determined by CPU 126 according to registration process instructions, the customer's credit card number, or any other unique identification code. At step 719, CPU 126 calculates the subscription expiration date using the current system date/time and the subscription duration stored in field 416 of the subscription option table record associated with the selected subscription. It should be understood that although a single expiration date is illustrated, a subscription may have multiple expiration dates, such as an expiration date for each item to be redeemed.

At step 720, the subscription status field 520 is populated to indicate a status of "active." At step 721, subscription registration data, preferably including the generated redemption code, a product identifier, a quantity remaining, a subscription start date and a subscription expiration date, is stored in storage device 134. Finally, the subscription registration process concludes with step 722 in which the generated redemption code is output to the subscriber via display 124. Alternatively, the redemption code could be printed on a paper receipt or provided in audio form.

Figure 8A:
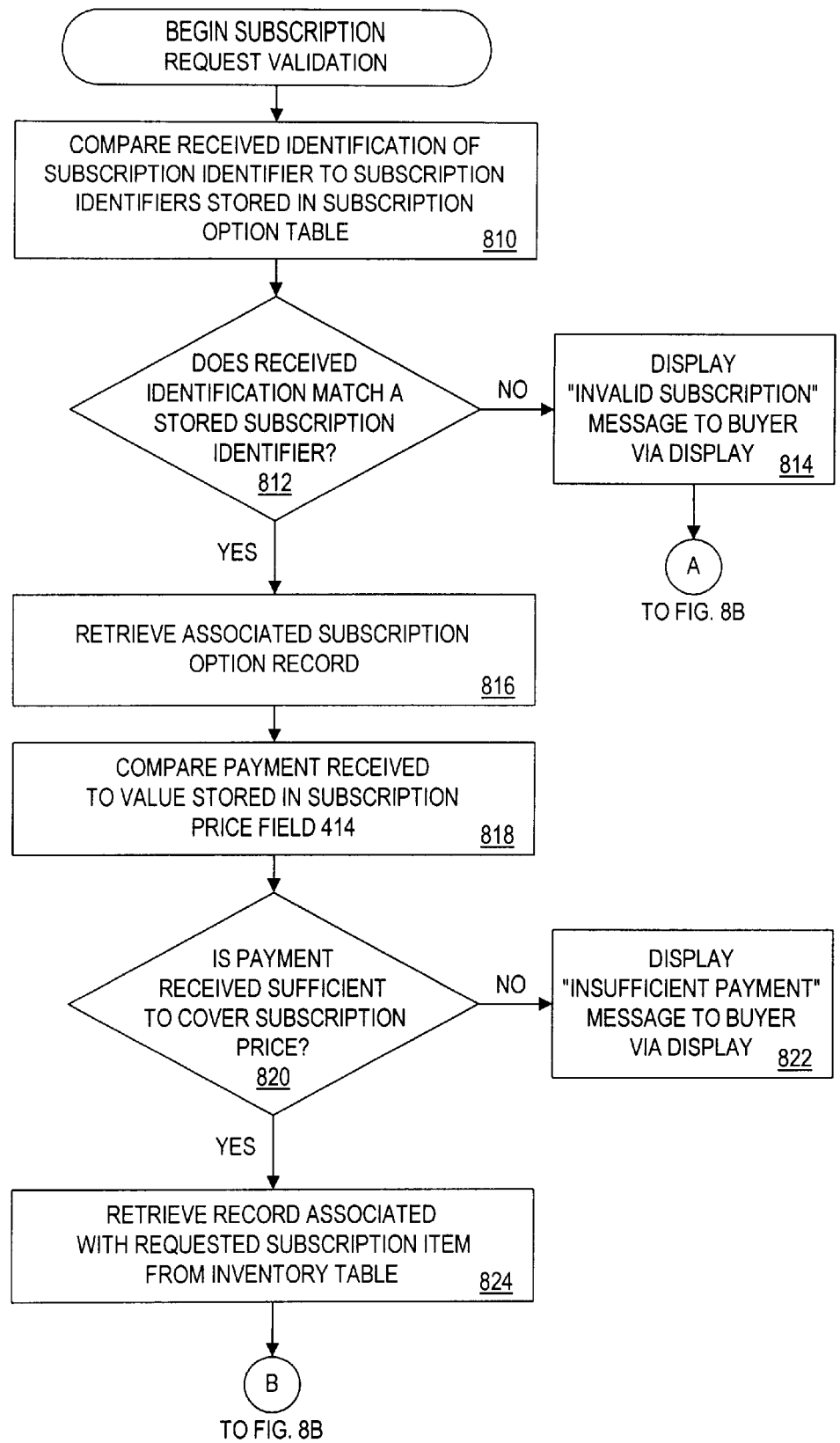
FIGS. 8A and 8B contain a flow chart illustrating the computer implemented steps used to validate a subscription registration request.
Figure 8B:
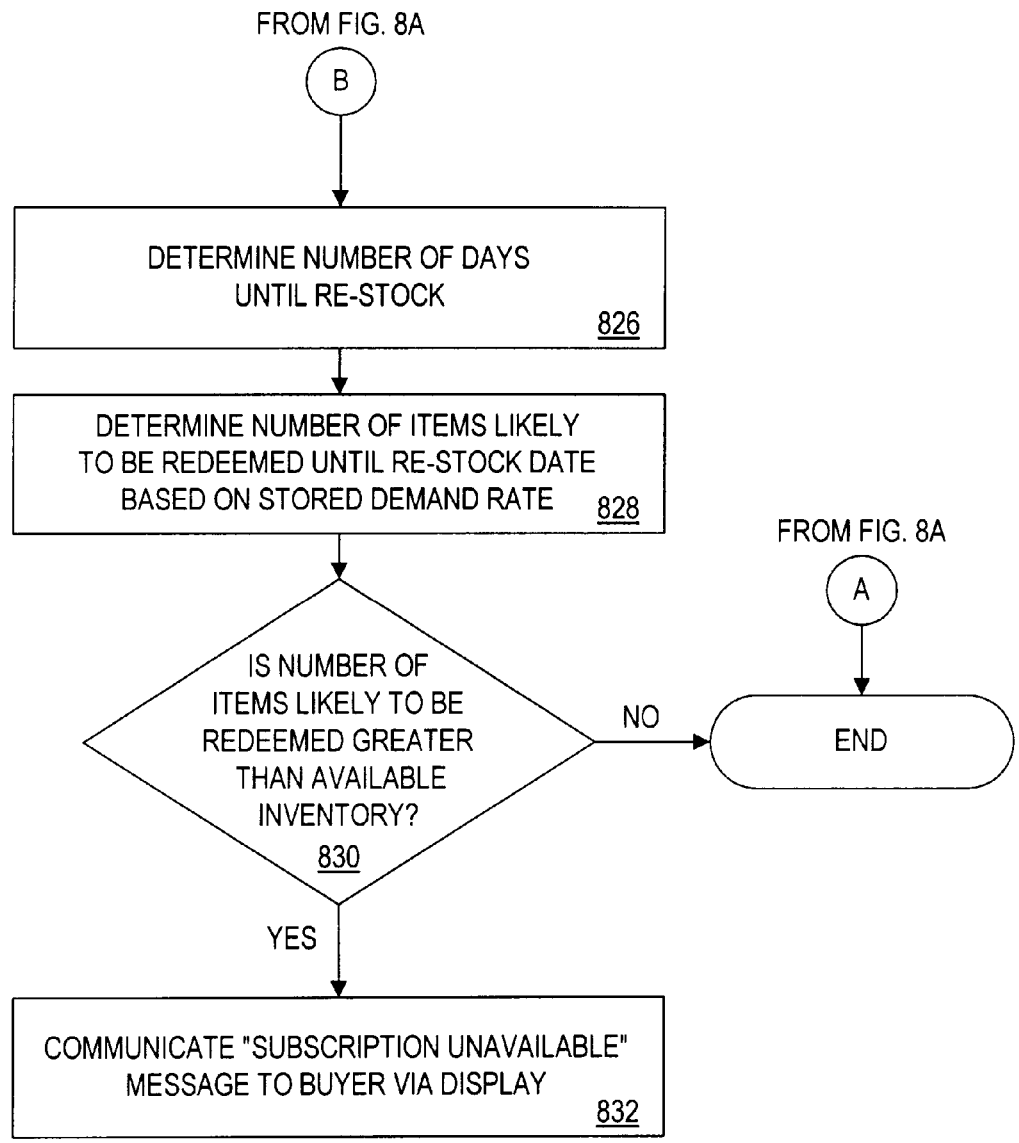

FIGS. 8A and 8B illustrate the sub-steps of the subscription request validation process represented by reference numeral 716. This process is performed to ensure the validity of the subscription to be registered. At sub-step 810, CPU 126 compares the received subscription identifier to the subscription identifiers stored in subscription option table 400. As indicated by decision block 812, if there is no match CPU 126 causes display 124 to display a message indicating that the entered subscription identifier is invalid (step 814). If the received subscription identifier is valid, the data in the associated subscription option record is retrieved (step 816).

At block 818, the payment received is compared to the value stored in subscription price field 414 of the retrieved record. If the received payment is insufficient to pay for the identified subscription, decision block 820 directs CPU 126 to execute step 822 and display a message indicating the insufficiency of payment to the buyer via display 124. If the received payment is sufficient, CPU 126 executes step 824 and retrieves the data in the associated inventory record is from table 600.

At step 826, CPU 126 determines the number of days until the next restocking. At step 828, CPU 126 determines the number of items likely to be redeemed until the restocking based on the demand rate stored in field 618 of inventory table 600. These sub-steps are performed to ensure that sufficient inventory is available to support the requested subscription in view of all of the outstanding subscriptions as well as the likely non-subscription sales. If the number of items likely to be redeemed is greater than the available inventory (determined at step 830), CPU 126 executes step 832 and directs display 124 to display a message indicating that the subscription is not available. Customers are thus spared the inconvenience of using the vending machine for a subscription redemption only to find that the machine is out of inventory.

The subscription request evaluation process described by FIGS. 8A and 8B is only one exemplary embodiment of such a process. The illustrated process is designed to provide a subscription only if the present inventory is likely to support the registered subscriptions and the forecasted non-subscription sales. This process values forecasted non-subscription sales, which typically have a higher profit margin, over subscription sales. Of course, if a vending machine operator valued subscriptions sales, which are pre-paid and enable more predictable inventory management, over non-subscription sales, the process could be easily modified so as to only consider registered subscriptions in forecasting available inventory.

Figure 9:
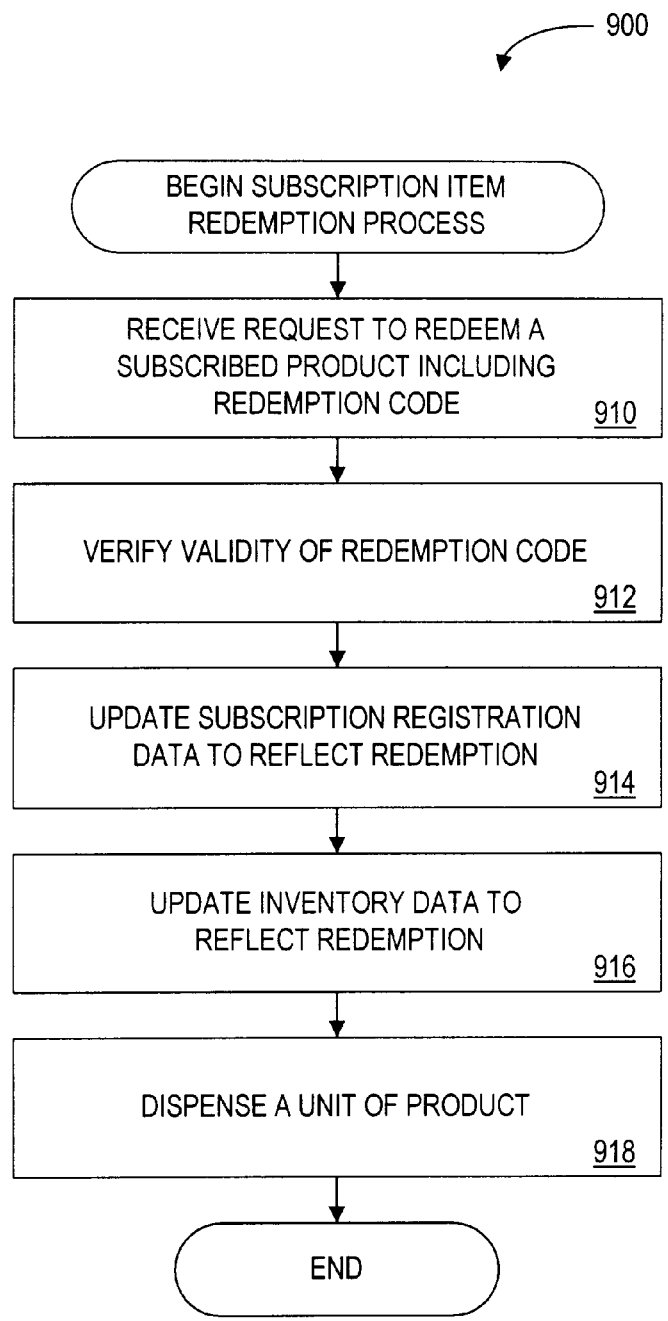
FIG. 9 is a flow chart illustrating the computer implemented steps used to process the redemption of an item, pursuant to an outstanding subscription, from the vending machine of FIG. 1.

Referring now to FIG. 9, a flowchart is depicted illustrating the steps of subscription item redemption process instructions 900. The exemplary subscription redemption process includes the step of receiving a request to redeem a subscribed product as indicated by reference numeral 910, for example by a customer entering "22516" into input device 110. In the present embodiment, the request to redeem the subscribed product includes a previously registered redemption code. At step 912, the step of verifying the validity of the received redemption code is illustrated. Step 912 may include a variety of sub-steps including: verifying that the received redemption code matches a previously registered redemption code stored in field 510 of subscription registration table 500, ensuring that the subscription identified by the received redemption code has not expired, and verifying that vending machine 100 has not sold out of the product associated with the received redemption code. These sub-steps are described more fully with reference to FIG. 10.

At steps 914 and 916, respectively, CPU 126 updates the subscription registration data and the inventory data associated with the redemption. When the subscription registration data is updated to reflect the redemption, CPU 126 decrements the value stored in quantity remaining field 518. If the value of quantity remaining field 518 is zero, or if field 516 stores a subscription expiration date that is chronologically prior to the system date/time, CPU 126 updates subscription status field 520 to reflect the expiration of the subscription registration. Preferably, if the subscription registration expires, CPU 126 causes display 124 to provide a message to the subscriber indicating the expiration of the subscription. At the conclusion of the redemption process, CPU 126 updates available inventory field 614 of inventory table 600, and at step 918, CPU 126 activates item dispenser 122 to complete the redemption.

Figure 10:
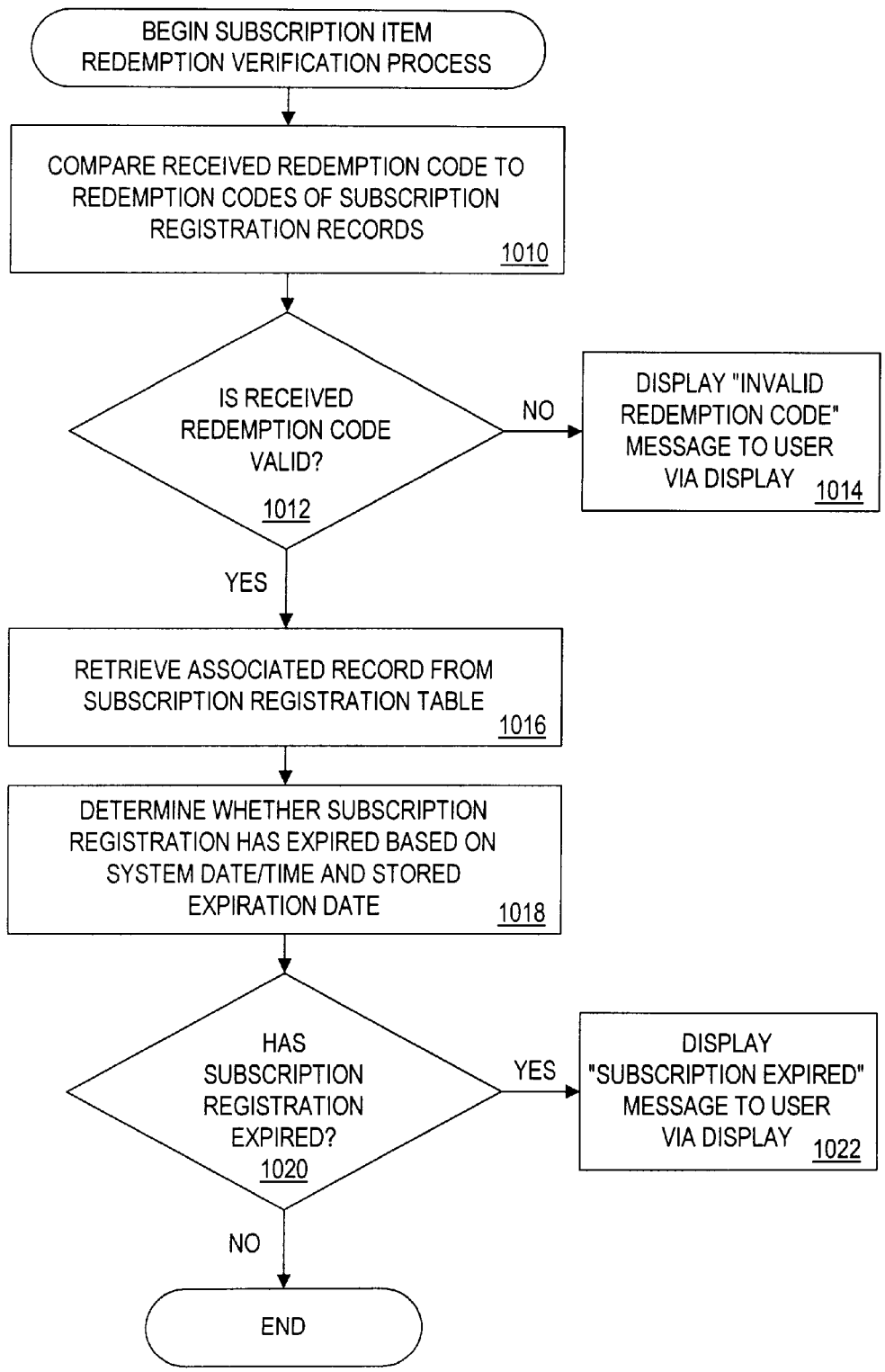
FIG. 10 is a flow chart illustrating the computer implemented steps used to verify a subscription redemption.

FIG. 10 illustrates the sub-steps of the subscription item redemption validation process represented by reference numeral 912. At sub-step 1010, CPU 126 compares the received redemption code to the redemption codes stored in field 510 of subscription registration table 500. As indicated by decision block 1012, if there is no match CPU 126 executes step 1014 and causes display 124 to display a message indicating that the input redemption code is invalid. The user may then be prompted to re-enter the code. If the received redemption code is valid, the data in the associated subscription registration record is retrieved as shown at block 1016.

At step 1018, CPU 126 determines whether the identified subscription registration has expired. This is accomplished by accessing the system date/time and comparing it to the date/time stored in field 516 of subscription table 500 for the associated subscription registration record. If the system date/time is later than the stored expiration date/time, the subscription has expired, and decision block 1020 directs CPU 126 to execute step 1022 and display a message indicating the expiration of the subscription registration to the customer via display 124.

Figure 11:
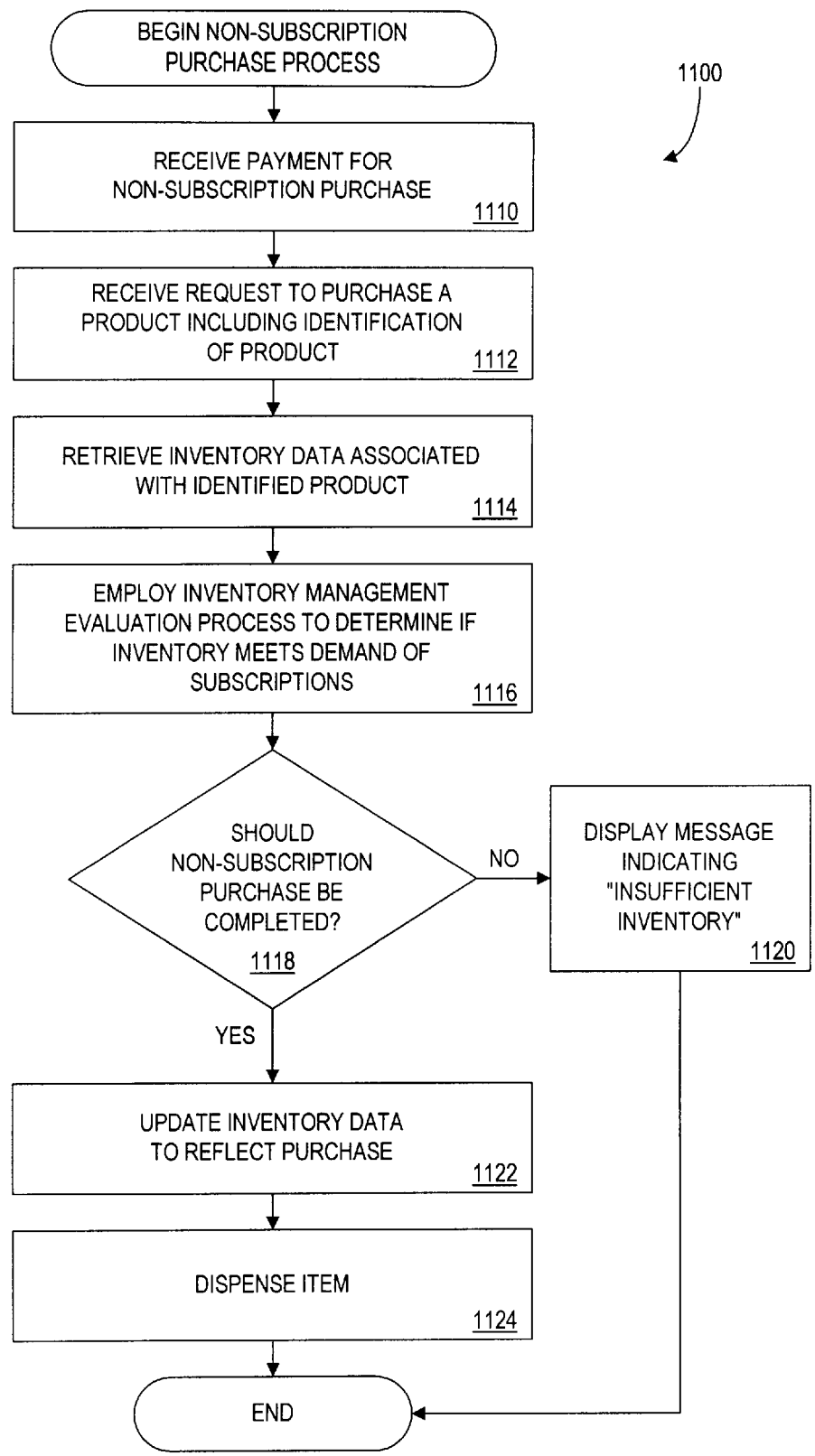
FIG. 11 is a flow chart illustrating the computer implemented steps used to process a purchase of a single item from the vending machine of FIG. 1.

FIG. 11 illustrates the steps of exemplary non-subscription purchase process instructions 1100. At step 1110, the non-subscription purchase process begins when CPU 126 receives an indication of payment from coin acceptor 112, bill validator 114 or magnetic stripe reader 116. At step 1112, CPU 126 receives a request to purchase a product. The request to purchase the product includes an identification of the product. In the present embodiment, the purchaser is required to input a product identifier via input device 110. Of course, the requested product could be identified in other ways such as by requiring the purchaser to press a particular button associated with one of many product dispensers.

At step 1114, CPU 126 uses the received product identifier to retrieve inventory data associated with the identified product. At step 1116, CPU 126 employs inventory management techniques to evaluate the inventory data associated with the identified product. Specifically, CPU 126 executes the sub-steps described more fully with reference to FIG. 12 to analyze forecasted demand for an item to ensure that the current inventory of the identified product meets the demand of the registered subscriptions. At decision block 1118, if vending machine 100 holds sufficient inventory to complete the requested non-subscription purchase, CPU 126 processes steps 1122 and 1124. If vending machine 100 does not hold sufficient inventory to complete the requested non-subscription purchase, CPU 126 causes display 126 to output a message indicating "insufficient inventory." (step 1120) In the preferred embodiment, the customer would then be prompted for an alternate product selection.

At step 1122, CPU 126 updates the inventory data associated with the requested product in field 614 of inventory table 600 to reflect the purchase and stores the updated data in storage device 134. At step 1124, the product is dispensed via dispenser 122, and the process is terminated.

Figure 12:
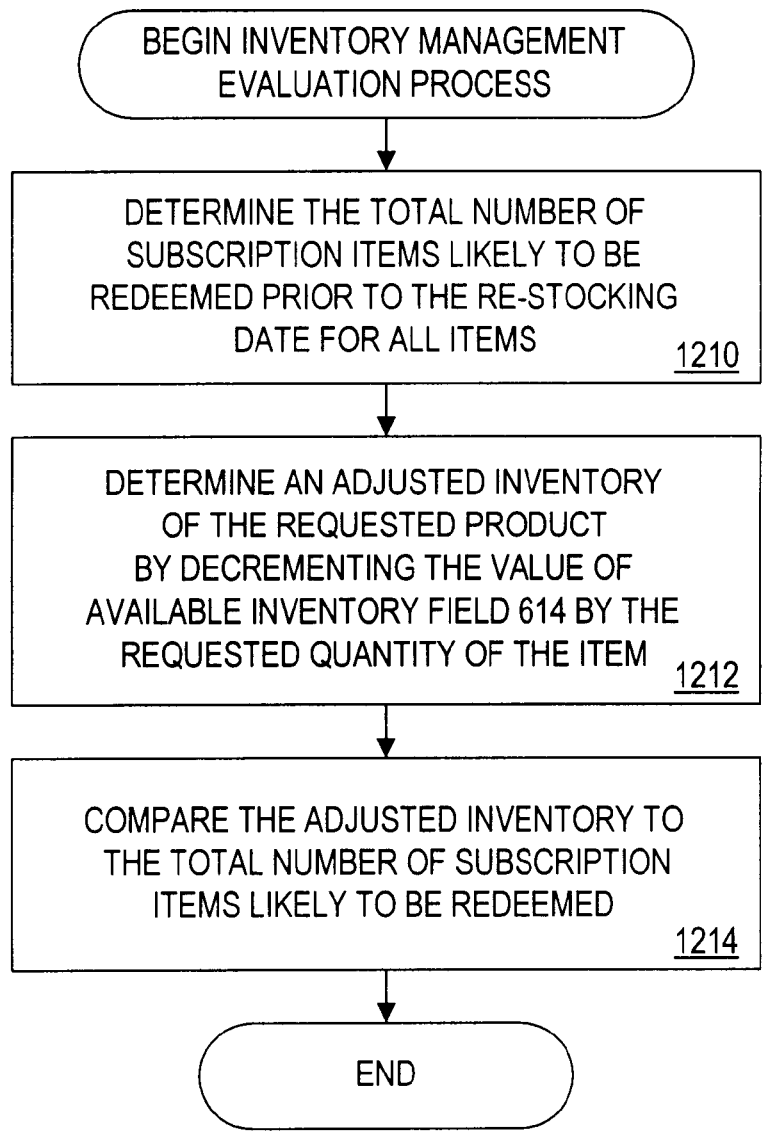
FIG. 12 is a flow chart illustrating the computer implemented steps used to evaluate the inventory of a product in the vending machine of FIG. 1.

FIG. 12 illustrates the sub-steps of the inventory management evaluation process represented by reference numeral 1116. At sub-step 1210, CPU 126 determines the total number of subscription items likely to be redeemed prior to the restocking date based on the demand rate stored in inventory table 600. As shown by step 1212, CPU 126 then determines an adjusted inventory value representing the remaining inventory if the non-subscription purchase should be completed. The adjusted inventory is calculated by subtracting the requested quantity of the item from the value stored in available inventory field 614. At step 1214, CPU 126 compares the adjusted inventory to the total number of subscription items likely to be redeemed. This comparison determines whether the non-subscription purchase should be completed in view of the inventory items reserved for subscription customers.

Figure 13:
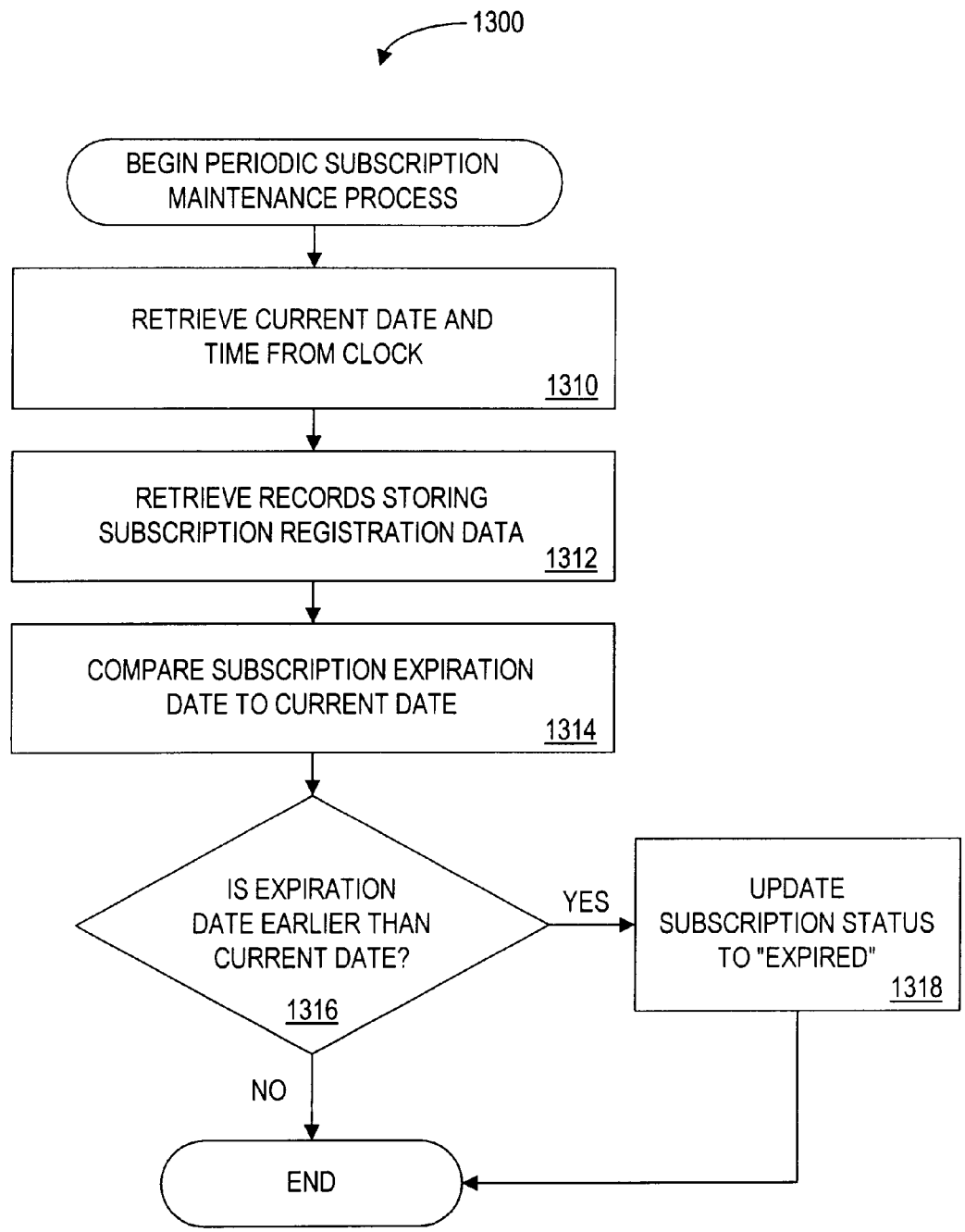
FIG. 13 is a flow chart illustrating the computer implemented steps used to maintain the subscription table of FIG. 5.

Referring now to FIG. 13, there is illustrated the steps of exemplary periodic subscription maintenance process 1300. At step 1310, CPU 126 retrieves the current date and time from clock 132. At steps 1312 and 1314, CPU retrieves a record from subscription registration table 500 and compares the contents of subscription expiration date field 516 to the current date retrieved at step 1310. At decision block 1316, if subscription expiration date field 516 contains a date earlier than the current date, CPU 126 updates subscription status field 520 to indicate that the subscription associated with the record has expired step (1318). The subscription registration record is then archived in storage device 134 for later auditing.

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

What is claimed is:

1. A method for registering a subscription to purchase a plurality of items dispensed by a vending machine, the method comprising the steps of:

receiving an indication of payment for said subscription;

receiving a request to register said subscription;

determining a redemption code; and storing subscription registration data including said redemption code.

2. The method of claim 1 wherein said step of receiving an indication of payment includes receiving currency.

3. The method of claim 1 wherein said step of receiving an indication of payment includes reading data from a magnetic stripe.

4. The method of claim 3 wherein said data from said magnetic stripe represents a financial account number.

5. The method of claim 1 wherein the step of receiving an indication of payment includes reading data from a stored value device.

6. The method of claim 1 wherein the step of receiving an indication of payment includes receiving an identifier associated with a pre-paid financial account.

7. The method of claim 1 wherein said subscription registration data includes a quantity.

8. The method of claim 1 wherein said subscription registration data includes a product identifier.

9. The method of claim 1 further comprising the step of determining a quantity of items available for said subscription.

10. The method of claim 1 further comprising the step of outputting said redemption code.

11. The method of claim 1 further comprising the steps of:

determining a subscription expiration date; and outputting said subscription expiration date.

12. The method of claim 1 further comprising the steps of receiving a product identifier associated with the subscription; and evaluating inventory data associated with said product identifier.

13. A method for dispensing an item by a vending machine, the method comprising the steps of:
receiving a request to redeem said item;
receiving a redemption code corresponding to said item;
updating subscription registration data associated with said redemption code to reflect said request to redeem said item;
retrieving inventory data associated with said redemption code, said inventory data including a quantity;
updating said inventory data to reflect said redemption; and
storing said inventory data; and
dispensing said item.

14. The method of claim 13 further comprising the step of evaluating the validity of said redemption code.

15. A method for processing a purchase of an item dispensed by a vending machine, the method comprising the steps of:
receiving an indication of payment for said item;
receiving a request to purchase said item;
evaluating inventory data associated with said item to determine availability including:
determining a forecast demand value;
determining forecast subscription redemption value;
determining a forecast inventory quantity based on said demand value and said subscription redemption value;
determining an adjusted inventory quantity; and
comparing said forecast inventory quantity to said adjusted inventory quantity; and the method further comprising:
dispensing said item.

16. A method for purchasing a subscription for a plurality of items of a product from a vending machine, the method comprising the steps of:
providing payment for said subscription;
transmitting a request to purchase said subscription; and
providing a redemption code.

17. The method of claim 16 further comprising the step of receiving a redemption code.

18. The method of claim 16 wherein said request to purchase includes an indication of said product and a quantity.

19. The method of claim 16 wherein said step of providing payment includes the step of inputting currency.

20. The method of claim 16 wherein said step of providing includes the step of inputting credit data.

21. A vending machine, comprising:
an input device for receiving a request to register a subscription to purchase a specified quantity of items of a specified product from said vending machine;
an output device for outputting a redemption code corresponding to said subscription;
a payment receiver for receiving a user-supplied payment;
a dispenser for storing and dispensing said at least one item of said product;
a storage device for storing subscription registration data pertaining to said subscription, said subscription registration data including a redemption code, a product identifier and a subscription quantity; and
a processor connected to said input device, said output device, said payment receiver, said storage device and said dispenser, said processor operative to
receive said request to register a subscription from said input device,
determine said redemption code,
store said redemption code in said subscription registration data, and
store said specified quantity in said subscription registration data.

22. The vending machine of claim 21 wherein said processor is further operative to operate said output device to output said redemption code.

23. A vending machine, comprising:
at least one input device for receiving a request to redeem an item and a user-supplied redemption code;
a dispenser for storing and dispensing at least one item of a product;
a storage device storing subscription registration data pertaining to a subscription corresponding to said product, said subscription registration data including a redemption code, a product identifier and a subscription quantity; and
a processor connected to said storage device, said input device and said dispenser, said processor operative to
receive said user-supplied redemption code from said input device,
determine if said user-supplied redemption code matches a stored redemption code, and
operate said dispenser to dispense said item.

24. A vending machine, comprising:
at least one input device for receiving a request to purchase an item and a user-supplied redemption code;
a dispenser for storing and dispensing at least one item of a product;
a storage device storing subscription registration data pertaining to a subscription corresponding to said product, said subscription registration data including a redemption code, a product identifier and a subscription quantity; and
a processor connected to said storage device, said input device and said dispenser, said processor operative to
receive an indication of payment for said item,
receive a request to purchase said item, and
determine if said item is reserved based on said subscription registration data.

25. The vending machine of claim 24 wherein said processor is further operative to operate said dispenser to dispense said item.

26. A processing module for use with a vending machine, comprising:
request receiving means for receiving a request to register a subscription to purchase a specified quantity of a specified product from said vending machine;
output means for outputting a redemption code corresponding to said subscription;
payment receiving means for receiving a user-supplied payment;
dispenser activation means for causing said vending machine to dispense said at least one item of said product;
memory means for storing subscription registration data pertaining to said subscription, said subscription registration data including a redemption code, a product identifier and a subscription quantity; and
processing means connected to said request receiving means, said output means, said payment receiving means, said memory means and said dispenser activation means, said processor operative to receive said request to register a subscription from said request receiving means, determine said redemption code, store said redemption code in said subscription registration data, and store said specified quantity in said subscription registration data.

27. The processing module of claim 26 wherein said processor is further operative to operate said output means to output said redemption code.

28. A processing module for use with a vending machine, comprising:

request receiving means for receiving a request to redeem an item;

input means for receiving a user-supplied redemption code;

dispenser activation means for dispensing at least one item of a product;

memory means for storing subscription registration data pertaining to a subscription corresponding to said product, said subscription registration data including said redemption code, a product identifier and a subscription quantity; and processing means connected to said request receiving means, said input means, said dispenser activation means and said memory, said processing means operative to receive said user-supplied redemption code from said input means, and determine if said user-supplied redemption code matches a stored redemption code.

29. The processing module of claim 20 wherein said processor is further operative to operate said dispenser activation means to dispense said item.

30. A processing module for use with a vending machine, comprising:

at least one input device for receiving a user-supplied redemption code and a request to redeem an item;

a dispenser for storing and dispensing at least one item of a product;

a storage device storing subscription registration data pertaining to a subscription corresponding to said product, said subscription registration data including a redemption code, a product identifier and a subscription quantity; and a processor connected to said storage device, said input device and said dispenser, said processor operative to receive an indication of payment for said item;

receive a request to purchase said item; and determine if said item is reserved based on said subscription registration data.

31. The processing module of claim 30 wherein said processor is further operative to operate said dispenser to dispense said item.

32. A computer-readable storage medium encoded with processing instructions for implementing a method for registering a subscription to purchase a plurality of items dispensed by a vending machine, said processing instructions for directing a computer to perform the steps of:

receiving an indication of payment for said subscription;

receiving a request to register said subscription, said request including an indication of said plurality of items;

determining a redemption code; and storing subscription registration data including said redemption code, a product identifier and said quantity.

33. The computer-readable storage medium of claim 32 further including an instruction for directing a computer to perform the step of outputting said redemption code.

34. A computer-readable storage medium encoded with processing instructions for implementing a method for processing a redemption of an item dispensed by a vending machine, said processing instructions for directing a computer to perform the steps of:

receiving a request to redeem said item;

receiving a redemption code corresponding to said item;

updating subscription registration data associated with said redemption code to reflect said request to redeem said item;

retrieving inventory data associated with said redemption code, said inventory data including a quantity;

updating said inventory data to reflect said redemption;

storing said inventory data;

dispensing said item.

35. The computer-readable storage medium of claim 34 further including processing instructions for directing a computer to perform the step of dispensing said item.

36. A computer-readable storage medium encoded with processing instructions for implementing a method for processing a purchase of an item dispensed by a vending machine, said processing instructions for directing a computer to perform the steps of:

receiving an indication of payment for said item;

receiving a request to purchase said item;

evaluating inventory data associated with said item to determine availability including:

determining a forecast demand value;

determining forecast subscription redemption value;

determining a forecast inventory quantity based on said demand value and said subscription redemption value;

determining an adjusted inventory quantity; and comparing said forecast inventory quantity to said adjusted inventory quantity, said method further comprising the step of:

dispensing said item.

* * * * *

UNITED STATES PATENT AND TRADEMARK OFFICE
CERTIFICATE OF CORRECTION

PATENT NO. : 5,988,346

DATED : November 23, 1999

INVENTOR(S) : Daniel E. Tedesco, et al.

It is certified that error appears in the above-identified patent and that said Letters Patent is hereby corrected as shown below:

Column 4, line 36, after "input device" insert --110--.

Delete claim 17.

Signed and Sealed this

Twenty-sixth Day of December, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO.   : 5,988,346
DATED        : November 23, 1999
INVENTOR(S)  : Daniel E. Tedesco et al.

It is certified that error appears in the above-identified patent and that said Letters Patent is hereby corrected as shown below:

<u>Column 10, lines 32-67 through Column 14, line 54,</u>
The claims should be renumbered as follows:

1. A method for registering a subscription to purchase a plurality of items dispensed by a vending machine, the method comprising the steps of:

receiving an indication of payment for said subscription;

receiving a request to register said subscription;

determining a redemption code; and storing subscription registration data including said redemption code.

2. The method of claim 1 wherein said step of receiving an indication of payment includes receiving currency.

3. The method of claim 1 wherein said step of receiving an indication of payment includes reading data from a magnetic stripe.

4. The method of claim 3 wherein said data from said magnetic stripe represents a financial account number.

5. The method of claim 1 wherein the step of receiving an indication of payment includes reading data from a stored value device.

6. The method of claim 1 wherein the step of receiving an indication of payment includes receiving an identifier associated with a pre-paid financial account.

7. The method of claim 1 wherein said subscription registration data includes a quantity.

UNITED STATES PATENT AND TRADEMARK OFFICE
CERTIFICATE OF CORRECTION

PATENT NO.    : 5,988,346
DATED         : November 23, 1999
INVENTOR(S)   : Daniel E. Tedesco et al.

It is certified that error appears in the above-identified patent and that said Letters Patent is hereby corrected as shown below:

8. The method of claim 1 wherein said subscription registration data includes a product identifier.

9. The method of claim 1 further comprising the step of determining a quantity of items available for said subscription.

10. The method of claim 1 further comprising the step of outputting said redemption 11. The method of claim 1 further comprising the steps of:
    determining a subscription expiration date; and
    outputting said subscription expiration date.

12. The method of claim 1 further comprising the steps of
    receiving a product identifier associated with the subscription; and
    evaluating inventory data associated with said product identifier.

13. A method for dispensing an item by a vending machine, the method comprising the steps of:
    receiving a request to redeem said item;
    receiving a redemption code corresponding to said item;
    updating subscription registration data associated with said redemption code to reflect said request to redeem said item;
    retrieving inventory data associated with said redemption code, said inventory data including a quantity;
    updating said inventory data to reflect said redemption; and
    storing said inventory data; and
    dispensing said item.

UNITED STATES PATENT AND TRADEMARK OFFICE
CERTIFICATE OF CORRECTION

PATENT NO. : 5,988,346
DATED : November 23, 1999
INVENTOR(S) : Daniel E. Tedesco et al.

It is certified that error appears in the above-identified patent and that said Letters Patent is hereby corrected as shown below:

14. The method of claim 13 further comprising the step of evaluating the validity of said redemption code.

15. A method for processing a purchase of an item dispensed by a vending machine, the method comprising the steps of:

receiving an indication of payment for said item;
    receiving a request to purchase said item;
    evaluating inventory data associated with said item to determine availability including:
        determining a forecast demand value;
        determining forecast subscription redemption value;
        determining a forecast inventory quantity based on said demand value and said subscription redemption value;
        determining an adjusted inventory quantity; and
        comparing said forecast inventory quantity to said adjusted inventory quantity; and the method further comprising:
    dispensing said item.

16. A method for purchasing a subscription for a plurality of items of a product from a vending machine, the method comprising the steps of:
    providing payment for said subscription;
    transmitting a request to purchase said subscription; and
    providing a redemption code.

17. The method of claim 16 wherein said request to purchase includes an indication of said product and a quantity.

18. The method of claim 16 wherein said step of providing payment includes the step of inputting currency.

19. The method of claim 16 wherein said step of providing includes the step of inputting credit data.

20. A vending machine, comprising:
    an input device for receiving a request to register a subscription to purchase a specified quantity of items of a specified product from said vending machine;

UNITED STATES PATENT AND TRADEMARK OFFICE
CERTIFICATE OF CORRECTION

PATENT NO.    : 5,988,346
DATED         : November 23, 1999
INVENTOR(S)   : Daniel E. Tedesco et al.

It is certified that error appears in the above-identified patent and that said Letters Patent is hereby corrected as shown below:

an output device for outputting a redemption code corresponding to said subscription;

a payment receiver for receiving a user-supplied payment;

a dispenser for storing and dispensing said at least one item of said product;

a storage device for storing subscription registration data pertaining to said subscription, said subscription registration data including a redemption code, a product identifier and a subscription quantity; and a processor connected to said input device, said output device, said payment receiver, said storage device and said dispenser, said processor operative to receive said request to register a subscription from said input device, determine said redemption code, store said redemption code in said subscription registration data, and store said specified quantity in said subscription registration data.

21. The vending machine of claim 20 wherein said processor is further operative to operate said output device to output said redemption code.

22. A vending machine, comprising:

at least one input device for receiving a request to redeem an item and a user-supplied redemption code;

a dispenser for storing and dispensing at least one item of a product;

a storage device storing subscription registration data pertaining to a subscription corresponding to said product, said subscription registration data including a redemption code, a product identifier and a subscription quantity; and a processor connected to said storage device, said input device and said dispenser, said processor operative to receive said user-supplied redemption code from said input device, determine if said user-supplied redemption code matches a stored redemption code, and operate said dispenser to dispense said item.

UNITED STATES PATENT AND TRADEMARK OFFICE
CERTIFICATE OF CORRECTION

PATENT NO.     : 5,988,346
DATED          : November 23, 1999
INVENTOR(S)    : Daniel E. Tedesco et al.

It is certified that error appears in the above-identified patent and that said Letters Patent is hereby corrected as shown below:

23.    A vending machine, comprising:

at least one input device for receiving a request to purchase an item and a user-supplied redemption code;

a dispenser for storing and dispensing at least one item of a product;

a storage device storing subscription registration data pertaining to a subscription corresponding to said product, said subscription registration data including a redemption code, a product identifier and a subscription quantity; and a processor connected to said storage device, said input device and said dispenser, said processor operative to receive an indication of payment for said item, receive a request to purchase said item, and determine if said item is reserved based on said subscription registration data.

24.    The vending machine of claim 23 wherein said processor is further operative to operate said dispenser to dispense said item.

25.    A processing module for use with a vending machine, comprising:

request receiving means for receiving a request to register a subscription to purchase a specified quantity of a specified product from said vending machine;

output means for outputting a redemption code corresponding to said subscription;

payment receiving means for receiving a user-supplied payment;

dispenser activation means for causing said vending machine to dispense said at least one item of said product;

memory means for storing subscription registration data pertaining to said subscription, said subscription registration data including a redemption code, a product identifier and a subscription quantity; and processing means connected to said request receiving means, said output means, said payment receiving means, said memory means and said dispenser activation means, said processor operative to

UNITED STATES PATENT AND TRADEMARK OFFICE
CERTIFICATE OF CORRECTION

PATENT NO.   : 5,988,346
DATED        : November 23, 1999
INVENTOR(S)  : Daniel E. Tedesco et al.

It is certified that error appears in the above-identified patent and that said Letters Patent is hereby corrected as shown below:

receive said request to register a subscription from said request receiving means,
        determine said redemption code,
        store said redemption code in said subscription registration data, and
        store said specified quantity in said subscription registration data.

26. The processing module of claim 25 wherein said processor is further operative to operate said output means to output said redemption code.

27. A processing module for use with a vending machine, comprising:
    request receiving means for receiving a request to redeem an item;
    input means for receiving a user-supplied redemption code;
    dispenser activation means for dispensing at least one item of a product;
    memory means for storing subscription registration data pertaining to a subscription corresponding to said product, said subscription registration data including said redemption code, a product identifier and a subscription quantity; and
    processing means connected to said request receiving means, said input means, said dispenser activation means and said memory, said processing means operative to
        receive said user-supplied redemption code from said input means, and
        determine if said user-supplied redemption code matches a stored redemption code.

28. The processing module of claim 27 wherein said processor is further operative to operate said dispenser activation means to dispense said item.

29. A processing module for use with a vending machine, comprising:
    at least one input device for receiving a user-supplied redemption code and a request to redeem an item;
    a dispenser for storing and dispensing at least one item of a product;
    a storage device storing subscription registration data pertaining to a subscription corresponding to said product, said subscription registration data including a redemption code, a product identifier and a subscription quantity; and
    a processor connected to said storage device, said input device and said dispenser, said processor operative to
        receive an indication of payment for said item;
        receive a request to purchase said item; and
        determine if said item is reserved based on said subscription registration data.

UNITED STATES PATENT AND TRADEMARK OFFICE
CERTIFICATE OF CORRECTION

PATENT NO.    : 5,988,346
DATED         : November 23, 1999
INVENTOR(S)   : Daniel E. Tedesco et al.

It is certified that error appears in the above-identified patent and that said Letters Patent is hereby corrected as shown below:

30. The processing module of claim 29 wherein said processor is further operative to operate said dispenser to dispense said item.

31. A computer-readable storage medium encoded with processing instructions for implementing a method for registering a subscription to purchase a plurality of items dispensed by a vending machine, said processing instructions for directing a computer to perform the steps of:
    receiving an indication of payment for said subscription;
    receiving a request to register said subscription, said request including an indication of said plurality of items;
    determining a redemption code; and
    storing subscription registration data including said redemption code, a product identifier and said quantity.

32. The computer-readable storage medium of claim 31 further including an instruction for directing a computer to perform the step of outputting said redemption code.

33. A computer-readable storage medium encoded with processing instructions for implementing a method for processing a redemption of an item dispensed by a vending machine, said processing instructions for directing a computer to perform the steps of:
    receiving a request to redeem said item;
    receiving a redemption code corresponding to said item; [and]
    updating subscription registration data associated with said redemption code to reflect said request to redeem said item;
    retrieving inventory data associated with said redemption code, said inventory data including a quantity;
    updating said inventory data to reflect said redemption;
    storing said inventory data;
    dispensing said item.

34. The computer-readable storage medium of claim 33 further including processing instructions for directing a computer to perform the step of dispensing said item.

UNITED STATES PATENT AND TRADEMARK OFFICE
CERTIFICATE OF CORRECTION

PATENT NO.    : 5,988,346
DATED         : November 23, 1999
INVENTOR(S)   : Daniel E. Tedesco et al.

It is certified that error appears in the above-identified patent and that said Letters Patent is hereby corrected as shown below:

35.   A computer-readable storage medium encoded with processing instructions for implementing a method for processing a purchase of an item dispensed by a vending machine, said processing instructions for directing a computer to perform the steps of:

receiving an indication of payment for said item;

receiving a request to purchase said item;

evaluating inventory data associated with said item to determine availability including:

determining a forecast demand value;

determining forecast subscription redemption value;

determining a forecast inventory quantity based on said demand value and said subscription redemption value;

determining an adjusted inventory quantity; and comparing said forecast inventory quantity to said adjusted inventory quantity, said method further comprising the step of:

dispensing said item.

Signed and Sealed this

Fifteenth Day of April, 2003

JAMES E. ROGAN
*Director of the United States Patent and Trademark Office*